US008515482B2

(12) United States Patent
Muterspaugh (10) Patent No.: US 8,515,482 B2
(45) Date of Patent: Aug. 20, 2013

(54) APPARATUS AND METHOD FOR CONTROLLING A SIGNAL (75) Inventor: Max Ward Muterspaugh, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 839 days.

(21) Appl. No.: 12/664,903

(22) PCT Filed: Jun. 27, 2007

(86) PCT No.: PCT/US2007/014967
§ 371 (c)(1),
(2), (4) Date: Dec. 16, 2009

(87) PCT Pub. No.: WO2009/002317
PCT Pub. Date: Dec. 31, 2008

(65) Prior Publication Data
US 2010/0184386 A1 Jul. 22, 2010

(51) Int. Cl.
*H04B 7/00* (2006.01)
(52) U.S. Cl.
USPC ........... 455/522; 455/25; 455/63.1; 455/63.4; 455/68; 455/69; 455/561; 455/562.1
(58) Field of Classification Search
USPC ................. 455/9, 10, 25, 522, 63.1, 63.4, 68, 455/69, 78–82, 561, 562.1, 101
See application file for complete search history.

(56) References Cited

U.S. PATENT DOCUMENTS

| 5,444,762 | A | 8/1995 | Frey et al. |
| 6,021,317 | A * | 2/2000 | Irvin ............................. 455/78 |
| 6,697,641 | B1 | 2/2004 | Shapira |
| 7,024,163 | B1 * | 4/2006 | Barratt et al. .................. 455/69 |
| 7,253,717 | B2 * | 8/2007 | Armstrong et al. .......... 340/10.2 |

(Continued)

FOREIGN PATENT DOCUMENTS

| CN | 1486522 | 3/2004 |
| GB | 2 354 115 | 3/2001 |

(Continued)

OTHER PUBLICATIONS

Search Report dtd Mar. 19, 2008.

(Continued)

*Primary Examiner* — Tuan A Tran
(74) *Attorney, Agent, or Firm* — Robert D. Shedd; Vincent E. Duffy; Michael A. Pugel (57) ABSTRACT

The disclosed embodiments relate to an apparatus and method for controlling transmission of a transmitted signal in a communications device. The apparatus includes a first antenna for receiving a first signal using a first polarization, a second antenna for receiving the first signal and a second signal and transmitting the second signal in a second polarization, and a controller coupled to the first antenna and the second antenna for adjusting the transmitting by the second antenna in response to the first signal received by the first antenna and the second antenna. The method includes the steps of receiving a first signal using a first polarization, receiving the first signal using a second polarization, transmitting a second signal using the second polarization, and controlling the transmitting step in response to the step of receiving using the first polarization and the step of receiving using the second polarization.

22 Claims, 6 Drawing Sheets

(56) References Cited

U.S. PATENT DOCUMENTS

| | | | |
|---|---|---|---|
| 7,383,063 B2 * | 6/2008 | Forrester | 455/562.1 |
| 7,447,525 B2 * | 11/2008 | Forrester | 455/562.1 |
| 7,542,733 B1 * | 6/2009 | Ngan | 455/101 |
| 7,847,740 B2 * | 12/2010 | Dunn et al. | 343/702 |
| 8,064,959 B2 * | 11/2011 | Forrester | 455/562.1 |
| 2002/0002037 A1 * | 1/2002 | Ito et al. | 455/101 |
| 2002/0164954 A1 | 11/2002 | Jalali | |
| 2005/0153703 A1 | 7/2005 | Juntti et al. | |
| 2005/0227658 A1 | 10/2005 | Saliga et al. | |
| 2007/0066226 A1 | 3/2007 | Cleveland et al. | |
| 2007/0191068 A1 | 8/2007 | Ochi et al. | |
| 2007/0225052 A1 | 9/2007 | Yamazaki et al. | |
| 2009/0042614 A1 | 2/2009 | Karaoguz et al. | |
| 2009/0303935 A1 | 12/2009 | Ozluturk | |
| 2010/0216414 A1 | 8/2010 | Muterspaugh | |

FOREIGN PATENT DOCUMENTS

| | | |
|---|---|---|
| JP | 7303218 | 11/1995 |
| JP | 8186432 | 7/1996 |
| JP | 2000151543 | 5/2000 |
| JP | 2001103002 | 4/2001 |
| JP | 2002176379 | 6/2002 |
| JP | 2005117166 | 4/2005 |
| JP | 2005167569 | 6/2005 |
| JP | 2005318406 | 11/2005 |
| WO | WO9811679 | 3/1998 |
| WO | WO9839856 | 9/1998 |
| WO | WO9941803 | 8/1999 |
| WO | WO0239543 | 5/2002 |
| WO | WO 2004/015887 | 2/2004 |
| WO | WO2007055910 | 5/2007 |

OTHER PUBLICATIONS

Stevenson, et al., "Functional Requirements for the 802.22 WRAN Standard," IEEE 802.22-05/0007r39, Aug. 2005.

* cited by examiner

APPARATUS AND METHOD FOR CONTROLLING A SIGNAL

This application claims the benefit under 35 U.S.C. §365 of International Application PCT/US200/014967, filed Apr. 16, 2008, which was published in accordance with PCT article 21(2) on Nov. 6, 2008.

FIELD OF THE INVENTION

The present disclosure generally relates to communications systems and, more particularly, to wireless systems including terrestrial broadcast, cellular, Wireless-Fidelity (Wi-Fi), Wireless Regional Area Networks (WRAN), and satellite communications.

BACKGROUND OF THE INVENTION

This section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the United States, the TV spectrum currently comprises Advanced Television Systems Committee (ATSC) broadcast signals that co-exist with National Television Systems Committee (NTSC) broadcast signals. The ATSC broadcast signals are also referred to as digital TV (DTV) signals. NTSC transmission is planned to cease in 2009 and, at that time, the TV spectrum will comprise only ATSC broadcast signals. However, and as was the case when only NTSC broadcast signals existed, in any given region of the country, significant TV spectrum goes unused in order to prevent interference between broadcast channels.

Recently, Government agencies and business have suggested that different services could, in the future, share frequency bands such as the broadcast TV spectrum. Various standards bodies have proposed a new wireless radio service known as a wireless regional area network (WRAN) that would share the TV spectrum currently used by terrestrial television broadcasting. One such proposed WRAN system is intended to make use of unused broadcast channels in the TV spectrum, on a non-interfering basis. The primary objective of the proposed WRAN system is to address broadband access in rural and remote areas and low population density underserved markets and provide performance levels similar to those of broadband access technologies serving urban and suburban areas. In addition, the proposed WRAN system may also be able to be scaled in order to serve denser population areas where spectrum is available.

In order for the WRAN system and the currently present broadcast signals to share the spectrum, interference between the two systems must be mitigated. It has been proposed that one way to control interference would be to ensure that in some instances the two services have orthogonal polarization of their respective signal radiation patterns. In the United States, broadcast TV signals are generally transmitted using horizontal polarization. A WRAN system seeking to operate in or around a broadcast channel used by a local broadcast station could be required to transmit using vertical polarization to minimize interference.

In order for WRAN devices, such as base stations and home premises equipment, to accomplish transmission using a particular (e.g. vertical) radiation polarization pattern, the antenna used by the WRAN device may require accurate alignment and may further be required to maintain accurate alignment if a WRAN transmission is to occur. One such measure of alignment may be to determine the amount of cross polarization isolation between, for instance, the vertical or horizontal radiation patterns. For example, a cross polarization isolation figure given as 14 dB may be used as a measure of correct alignment for proper radiation polarization and may be acceptable to ensure minimal interference between services.

One possible method of achieving the high level of cross-polarization isolation necessary to assure the desired radiation polarization of the antenna used with the WRAN device would be to install the antenna used by the WRAN device using a skilled, professional installer. The antenna could include a reference member that could be adjusted with a level or plumb bob or some electrical measurement device in order to attain a particular radiation pattern orientation. The adjustment and alignment of the antenna would be performed prior to permitting transmission by the WRAN device. Periodic skilled or professional adjustment would then assure proper alignment of the radiating elements to produce the desired cross-polarization and therefore assure the desired radiation polarization.

However, professional installation and continued professional monitoring and maintenance of the antenna used with a WRAN device may prove unnecessarily expensive. Additionally any adjustment of the antenna after the initial adjustment, due to environmental or other conditions would likely require the installer to return. Furthermore, if the antenna becomes misadjusted and is not radiating in the proper polarization orientation, unnecessary and undesirable interference with broadcast signals may result. It is therefore desirable to have an antenna system that can determine whether an antenna used with a shared wireless service, such as the WRAN service, is properly aligned particularly with respect to preventing interference with a shared spectrum service, such as broadcast television.

SUMMARY OF THE INVENTION

The disclosed embodiments relate to an apparatus and method for controlling transmission of a signal in a communications device. In one embodiment an apparatus is described that includes a first antenna for receiving a first signal using a first polarization, a second antenna for receiving the first signal and a second signal and transmitting the second signal in a second polarization, and a controller coupled to the first antenna and the second antenna for adjusting the transmitting by the second antenna in response to the first signal received by the first antenna and the second antenna.

In a second embodiment a method for controlling a signal is described that includes the steps of receiving a first signal using a first polarization, receiving the first signal using a second polarization, transmitting a second signal using the second polarization, and controlling the transmitting step in response to the step of receiving using the first polarization and the step of receiving the second polarization.

The characteristics and advantages of the present disclosure will become more apparent from the following description, given by way of example.

DETAILED DESCRIPTION

One or more specific embodiments of the present disclosure will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The following describes a system and circuits used for transmitting and receiving signals in a WRAN that shares frequency spectrum with broadcast signals. Other systems and circuits utilized to transmit and receive other types of signals in other networks may include very similar structures. Those of ordinary skill in the art will appreciate that the embodiment of the circuits described herein is merely one potential embodiment. As such, in alternate embodiments, the components of the system may be rearranged or omitted, or additional components may be added based on particular attributes of the system. For example, with minor modifications, the circuits described may be configured for use in other wireless networks such as the Institute of Electrical and to Electronics Engineers (IEEE) 802.11.

Figure 1:
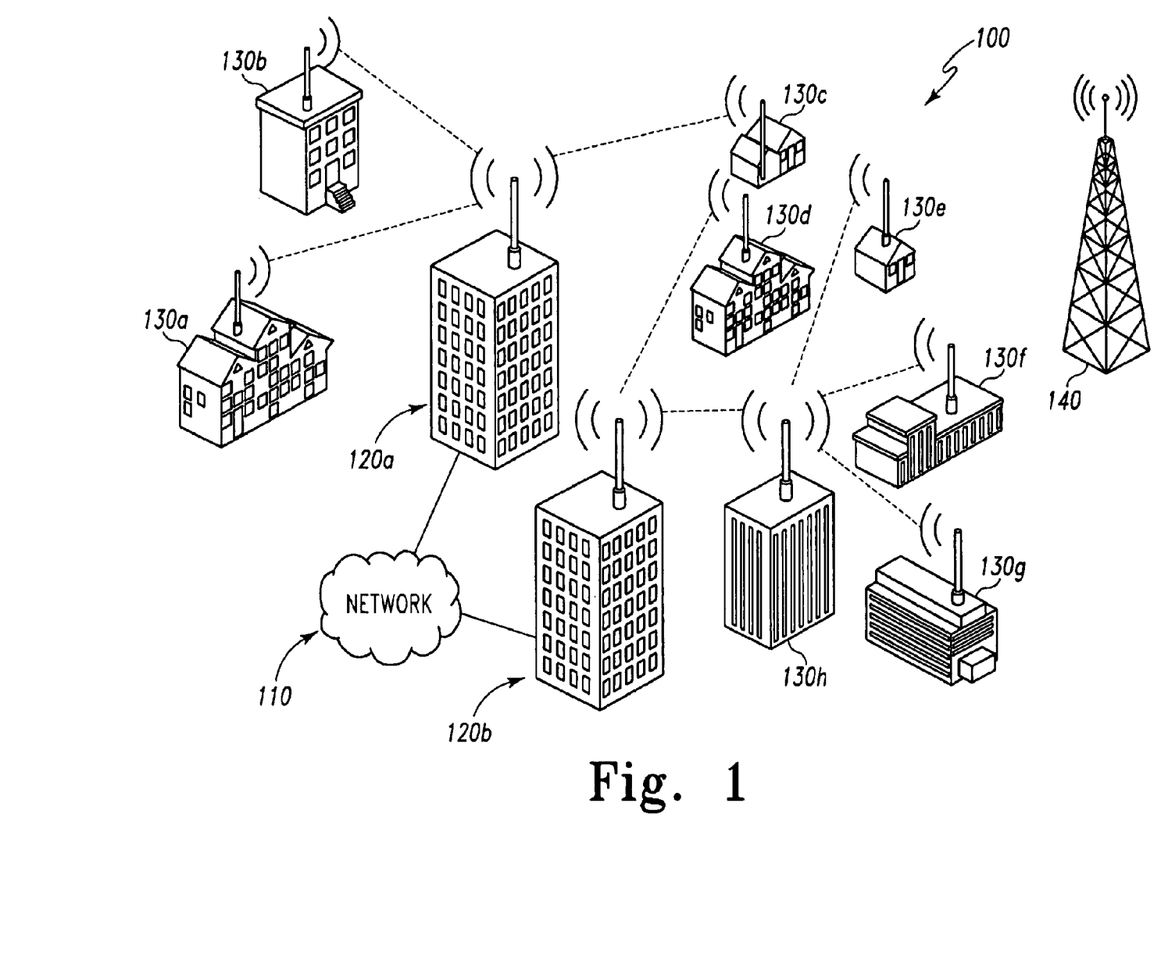
FIG. 1 is a block diagram of an exemplary WRAN used in a geographic region.

Turning now to the drawings and referring initially to FIG. 1, a block diagram 100 of an exemplary WRAN operating in a geographic area that includes local broadcast signals is shown. A network 110, such as an internet network provided by an Internet service provider, is physically interfaced with base stations 120a and 120b shown within buildings. Each of the base stations 120a and 120b typically contain circuitry for interfacing between network 110 and other devices used in the WRAN. Each of the base stations 120a and 120b may also include equipment placed within the building and may also include one or more antennas placed on top of the building for providing a wireless or radio interface to other devices used in the WRAN within the building. The one or more antennas may also be capable of receiving local broadcast television signals for use by devices in the WRAN or by television receivers and display devices within the building Each of the base stations 120a and 120b communicates through the wireless or radio interface to one or more customer premises equipment (CPE) devices 130a-h located within various structures within a region of geographic vicinity of the base stations 120a and 120b. The structures containing the CPE devices 130a-h may be at fixed locations, such as houses or apartment buildings or may be mobile, such as cars, not shown. In a preferred embodiment the regions of geographic vicinity between base stations 120a and 120b and CPE devices 130a-h are segregated into cells based on boundaries governed by radio signal characteristics and terrain. Additionally one or more of the CPE devices 130a-h, may be capable of communicating with base stations 120a and 120b and also with other CPE devices 130a-h. For example, CPE device 130h may be capable of communicating with both base station 120b as well as CPE devices 130e, f, and g, as shown. In this manner, CPE device 130h may be known as a repeater device in the WRAN.

A broadcast tower 140 is also located within the geographic region. The broadcast tower 140 transmits broadcast signals such as television signals from an antenna at the top of the broadcast tower 140 to the buildings and residences within the geographic region. The broadcast tower 140 may contain transmitting equipment such as amplifiers and additional signal generating equipment. A broadcast station, studio, and other signal facilities may be co-located with the broadcast tower 140 or may be located at a different location with the broadcast signal provided over a signal network, not shown. In a preferred embodiment the broadcast tower 140 is capable of transmitting a signal in the permitted television broadcast bands of low Very High Frequency (VHF) from 55 to 88 megahertz (MHz), high VHF from 175 top 215 MHz, or Ultra High Frequency (UHF) from 470 to 803 MHz. In many geographic regions, more than one broadcast tower 140 may be present transmitting broadcast signals at different frequencies.

Figure 2:
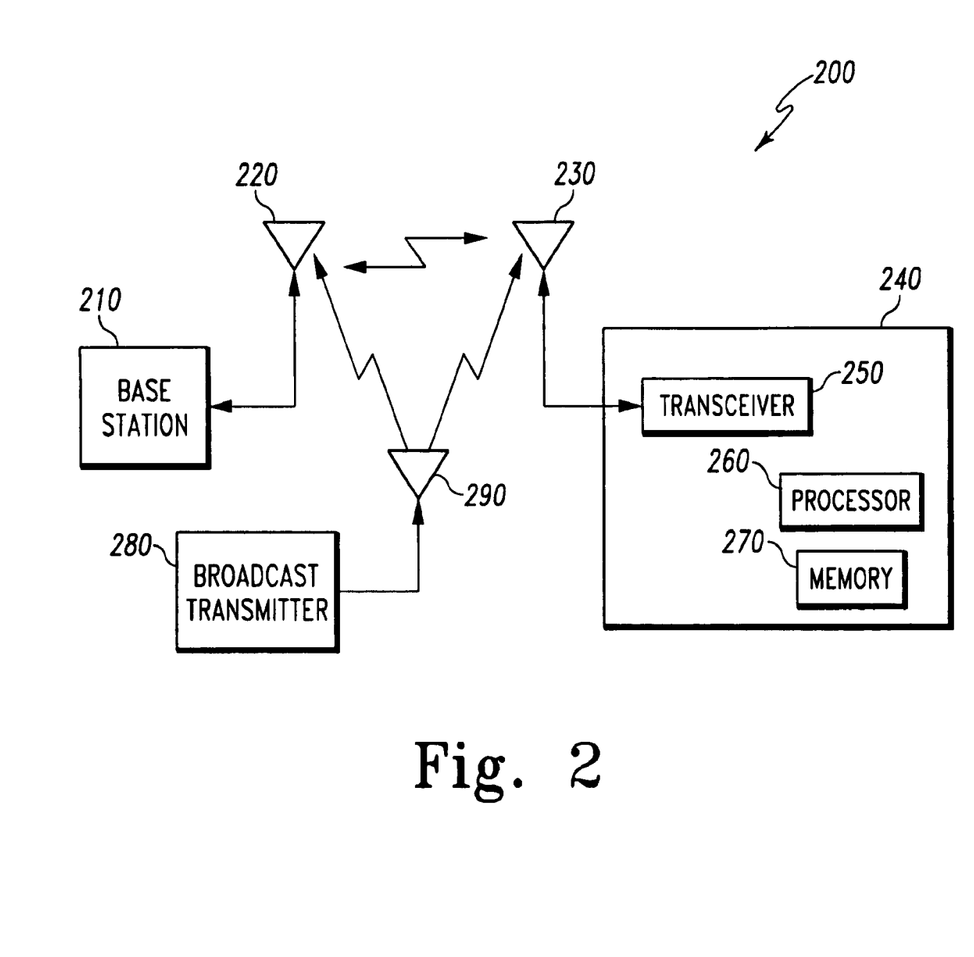
FIG. 2 is a block diagram of an exemplary system used in a WRAN.

Turning to FIG. 2, a block diagram of an exemplary system 200 used in a WRAN is shown. The block diagram shows a simplified set of devices without interconnections. Several blocks in the exemplary system 200 will have circuitry located within the blocks not shown but further described below. As shown in FIG. 1, the WRAN system contains at least one base station 210 capable of serving a geographical area (the WRAN area). Base station 210 may contain circuitry for processing and converting information and content received from a network through a network interface. Base station 210 may also contain a transceiver circuit for transmitting and receiving information using the WRAN. The base station 210 communicates over the WRAN to a CPE 240 through antennas 220 and 230 attached to base station 210 and CPE 240 respectively. In one embodiment, the physical layer protocol of communication between base station 210 and CPE 240 is based on orthogonal frequency division multiplexing (OFDM) using a packet based data structure.

Although antennas 220 and 230 are shown as single antennas, more than one antenna may be used by either base station 210 or CPE 240. Antennas 220 and 230, whether in single or multiple configuration, should be optimally capable of transmitting and receiving signals in a manner that does not interfere with normal operation of broadcast signals. In one embodiment, antennas 220 and 230 are capable of transmitting WRAN communications signals in a polarization that is orthogonal to the polarization of the transmitted broadcast signal. Antennas 220 and 230 may also be capable or receiving signals in the polarization of the transmitted broadcast signal.

CPE 240 includes one or more processors and associated memory as represented by processor 260 and memory 270. In this context, computer programs, or software, are stored in memory 270 for execution by processor 260. Processor 260 may also control other functions of CPE 240. Memory 270 is representative of any storage device, e.g., random-access memory (RAM), read-only memory (ROM), etc. and may be internal or external to CPE 240. Memory 270 may be volatile or non-volatile as necessary. CPE 240 also contains a transceiver 250 for receiving and transmitting information over the WRAN using antenna 230. Transceiver 250 may communicate information received or transmitted over the WRAN directly with processor 260 or may communicate with signal processor. Transceiver 250 will be described in more detail below. CPE 240 may additionally contain user interface components such as a keyboard and display screen for direct interaction with users. Alternately, CPE 240 may provide an indirect interface such as universal serial bus (USB) for interfacing to external devices such as home computers or televisions.

As mentioned above, base station 210 and CPE 240 may also be capable of receiving broadcast signals through antennas 220 and 230. Circuitry in base station 210 and CPE 240 is used for detecting broadcast signals provided by broadcast transmitter 280 through antenna 290. As noted previously, the WRAN signals co-exist with broadcast signals in the same range of frequency space and the WRAN system is not permitted to create harmful interference with an existing broadcast signal. A WRAN system may make use of unused television (TV) broadcast channels in the TV spectrum. The WRAN system may also co-occupy the frequency space of a broadcast channel or may occupy frequencies adjacent to the broadcast channel, provided that the WRAN system operates in a manner not to create harmful interference. In this regard, the WRAN system, as a secondary user, defers to the operation of local broadcast stations in order to avoid interference with their operation. As a result, CPE 240 may include the capability to determine the presence of local broadcast stations by, for instance, detecting signal energy. In addition, CPE 240 includes the capability to avoid interference with the local broadcast station using components and techniques as will be described further herein.

To enter a WRAN, a CPE 240 may first "associate" with a base station 210 in a particular geographic region. During this association, CPE 240 initially performs operations to determine the signal environment for the geographic region such as determining which local broadcast channels are present. CPE 240 may determine the presence of local broadcast signals by measuring the received signals on antenna 230, preferably when configured to optimally receive broadcast signals, such as in a horizontal polarization. CPE 240 may also determine the level of received broadcast signal on antenna 230 when it is optimally configured for operation in the WRAN, such as in a vertical polarization.

Based on the results from determining the signal environment, CPE 240 transmits information via transceiver 250 and antenna 230 containing the capability of CPE 240 to base station 210 using a control channel set up in the communications protocol. The reported capability includes, for instance, minimum and maximum transmission power, and a supported channel list for transmission and receiving. Base station 210, through antenna 220, may also communicate back to CPE 240 via the same control channel or through an alternate channel regarding operating requirements for a data communication channel and capabilities of the WRAN. The capabilities and requirements from the base station 210 may also include additional information such as the required polarization orientation for the antenna 230 for proper operation on the data communication channel or the determined polarization orientation of any local TV channels. The resulting information about the signal environment may then be provided to base station 210 in order to modify or augment the supported channel list for use in WRAN communications.

Figure 3:
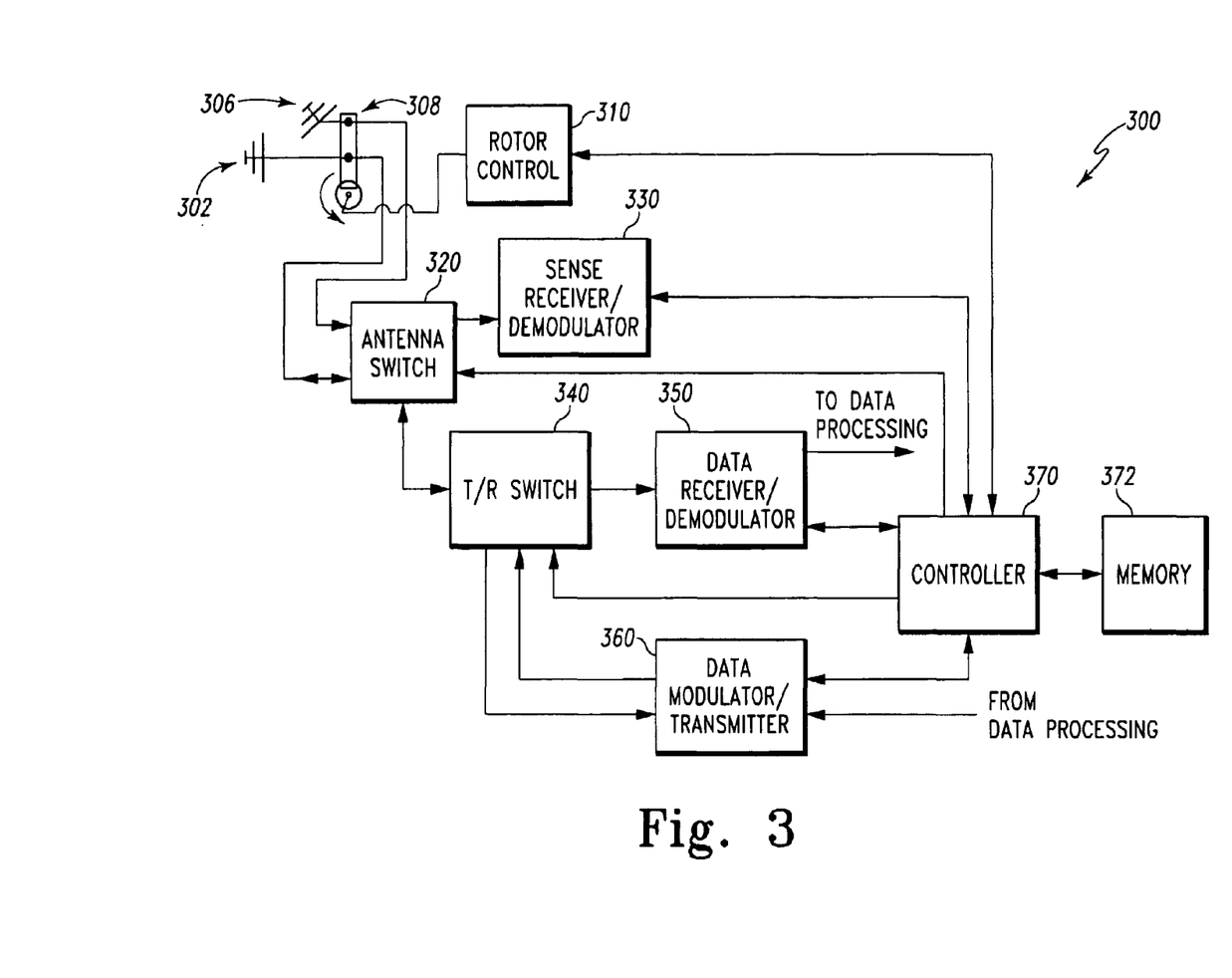
FIG. 3 is a block diagram of an embodiment of a transceiver device using an embodiment of the present disclosure.

Turning to FIG. 3, a block diagram 300 of a transceiver system using an embodiment of the present disclosure is shown. Although a transceiver circuit and antenna arrangement as found in CPE 240 is described below, the transceiver circuit found in base station 210 may be similar or identical in description and circuitry. Additionally, the blocks described represent a logical functional separation. The blocks may be maintained as separate physical elements or may be combined into larger submodules. The blocks may also be incorporated into one or more integrated circuits.

Two antennas, antenna 302 and antenna 306, provide the physical layer medium interface for communicating with the base station or other CPE. In a preferred embodiment, antenna 302 and 306 are log periodic antennas capable of operating over the entire broadcast signal range from low VHF through UHF in a narrow polarized beam pattern, as is well known to those skilled in the art. Antenna 302 and antenna 306 are physically oriented in a manner such that their antenna polarization patterns are orthogonal to each other on at least one axis. Antenna 302 may, for instance, be oriented for operation in vertical polarization and antenna 306 may, for instance, be oriented for operation in horizontal polarization.

Both antenna 302 and antenna 306 are mechanically mounted to an antenna mast 308. Antenna mast 308 also contains an element such as a motor for rotating antenna mast 308 about its longitudinal axis. The rotation of antenna mast 308 rotates both antenna 302 and antenna 306 through a revolution allowing both antennas to cover a full radial reception pattern.

Antenna mast 308 is controlled by rotor control 310. Rotor control 310 provides the electrical signals to the motor in antenna mast 308 for positioning or orienting antenna 302 and antenna 306 in a particular radial position. Rotor control 310 may also receive a signal back from antenna mast 308 indicating either an amount of movement or a relative radial position. Rotor control 310 is controlled by a control device such as controller 370, in conjunction with operation of the rest of the transceiver 300.

Both antenna 302 and antenna 306 electrically connect to antenna switch 320. Antenna switch 320 connects either antenna 302 or antenna 306 to either a sense circuit containing sense receiver/demodulator 330 or a data circuit containing data receiver/demodulator 350, data modulator/transmitter 360 and transmit/receive (T/R) switch 340. Antenna switch 320 contain one or more switching devices of either an electrical or electromechanical type as is well known to those skilled in the art. In a preferred embodiment, antenna switch 320 contains two electronically controllable single pole double throw (SPDT) switches, each including a no-connect or neutral position. One SPDT switch is used for switching signals from or to antenna 302 and antenna 306 and the other SPDT switch is used for switching signals from or to the sense circuit (receiver/demodulator 330) and data circuit (data receiver/demodulator 350, data modulator/transmitter 360, and T/R switch 340). Control for antenna switch 320 is generated from a controller device such as controller 370, which will be described further later.

One connection from antenna switch 320 connects to sense receiver/demodulator 330. Sense receiver/demodulator 330 receives and demodulates signals of the type of signal provided as a broadcast signal. In a preferred embodiment, sense receiver/demodulator 340 demodulates signals received with an analog signal format such as NTSC used for analog terrestrial signals or a digital format such as Eight Vestigial Sideband (8-VSB) used for ATSC digital terrestrial signals. Sense receiver/demodulator 330 may only be capable of partial signal demodulation, such as signal processing to the extent that a signal is detected. Sense receiver/demodulator 330 may also only be capable of determining a signal level or magnitude for a received signal. Alternately, sense receiver/demodulator 330 may be capable of complete demodulation including synchronization, equalization, and error correction. Complete demodulation would allow sense receiver/demodulator to provide a demodulated broadcast signal to other circuitry such as a display device, not shown, in order to allow transceiver 300 to act as a television signal receiver as well as a WRAN device.

Another connection from antenna switch 320 connects to T/R switch 340. T/R switch 340 has two switch states that control whether a signal is directed to the antennas 302 or 306 or directed from the antennas 302 or 306. T/R switch 340 is typically a SPDT type switch and may be built using a number of electrical circuit arrangements and components such as diodes, transistors, or gates as is well known to those skilled in the art.

When T/R switch 340 is switched to a receive state, the radio wave propagated signal received by antenna 302 or antenna 306, through antenna switch 320, is directed through T/R switch 340 and provided to data receiver/demodulator 350 connected to T/R switch 340. Data receiver/demodulator 350 contains circuits for amplifying, frequency converting, filtering, and demodulating the received signal. In a preferred embodiment, the data receiver/demodulator 350 processes the received signal by first amplifying and filtering the received signal. The data receiver/demodulator 350 may also convert the received signal from its received frequency to a second frequency better permitting signal demodulation. The data receiver/demodulator 350 may also demodulate the received signal after the signal is amplified, filtered, and converted, in accordance with a signal standard. In a preferred embodiment the demodulator is capable of OFDM demodulation in accordance with the signal standard used in the WRAN. The output signal, representing a digital data stream, is provided for further processing in circuitry such as a data signal processor, not shown.

When T/R switch 340 is switched to the transmit state, antenna 302 or antenna 306, through antenna switch 320, is connected through T/R switch 340 to data modulator/transmitter 360. Data modulator/transmitter 360 contains circuitry for interfacing an input data signal to a modulator, and may also contain circuits such as amplifiers, filters, mixer, and oscillators. Data modulator/transmitter 360 receives an input digital data signal from a signal processing circuit such as a data signal processor, not shown. The data modulator/transmitter 360 modulates the input digital data signal to generate a modulated signal. In a preferred embodiment, data modulator/transmitter 360 modulates the input digital data signal to form an OFDM signal in accordance with the signal standard used for the WRAN. The data modulator/transmitter 360 may also frequency convert the modulated signal to a frequency suitable for eventual transmission as a propagated radio wave signal at either antenna 302 or antenna 306. The data modulator/transmitter 360 may also filter and amplify the converted signal in order to further condition and prepare the signal for transmission. The output transmission signal from data modulator/transmitter 360 is provided to the T/R switch 340. The T/R switch 340, switched to transmit state, provides the transmission signal to either antenna 302 or antenna 306, through antenna switch 320, for propagation.

Although sense receiver/demodulator 330 and data receiver/demodulator 350 are described as separate blocks, they may be combined into one block. Further, the similar functionality allows the same circuit elements to perform both functions of sense receiver/demodulator 330 and data receiver/demodulator 350 in a manner such as multiplexing operation.

A controller 370 connects to rotor control 310, antenna switch 320, sense receiver/demodulator 330, T/R switch 340, data receiver/demodulator 350, and data modulator/transmitter 360. Controller 370 provides control signals for operating or tuning the frequency conversion circuitry in either the data receiver/demodulator 350 or data modulator/transmitter 360. Controller 370 may also control the operation of the demodulator in data receiver/demodulator 350 and modulator in data modulator/transmitter 360, allowing changes for different signal standards including signal bandwidth, error correction, or signal formats.

Controller 370 also provides control signals for operating the sense receiver/demodulator 330 in a manner similar to the control for data receiver/demodulator 350 described above. In addition, controller 370 may receive and process the sense or detect signal from sense receiver/demodulator 330 in order to determine the signal operating environment as well as to determining proper antenna configuration or to orientation for WRAN data transmission.

Controller 370 also provides control signals to rotor control 310 and antenna switch 320. The control signals to rotor control 310 may be based in inputs received, for instance, by controller 370 from sense receiver/demodulator 330 for received signal level or from inputs on location of other WRAN devices in the geographic region. Controller 370 may control antenna switch 320 based on the operating mode currently in use as described earlier.

Controller 370 may also receive signals from the sense receiver/demodulator 330, data receiver/demodulator 350, and data modulator/transmitter 360 indicating status or error conditions, or may receive commands to pass on to other circuits. Controller 370 also controls the switch state for operation of T/R switch 340. Control of the T/R switch 340 may be controlled by commands passed to the controller 370, or may be initiated by the controller 370 based on controlling other blocks. As described above, an error condition determined by the controller 370 or other blocks such as sense receive/demodulator 330 may allow the controller 370 to prevent T/R switch 340 from switching to transmit state. Controller 370 may be a separate component or may be incorporated in the signal processing circuitry, not shown, or further may be incorporated into a larger processor used for the entire CPE, as shown in FIG. 2.

A memory 372 may be connected to controller 370 and used for storing information about the signal environment, such as local broadcast channels and antenna configurations. Memory 372 may also store information about the WRAN in the geographic region as needed for proper operation. Memory 372 may be a separate component or may be incorporated into larger memory components used for the entire CPE, as shown in FIG. 2.

In operation, antenna switch 320 may have a number of operating modes, controlled by controller 370, for determining whether and when antenna 302 or antenna 306 is connected to either the sense circuit or the data circuit as described above. In a first preferred mode, antenna 306 is connected to the sense circuit while antenna 302 is not connected to either circuit. This first preferred mode is called broadcast sense desired mode. In this mode, signals received by antenna 306, normally configured for operation with broadcast signals, are provided to the circuit for receiving broadcast signals or sense circuit. Broadcast sense desired mode may be used to determine, for instance, if a broadcast signal is received by the broadcast antenna 306.

In a second preferred mode, antenna 302 is connected to the sense circuit and antenna 306 is not connected to either circuit. This second preferred mode is called broadcast sense undesired mode. In this mode, signals received by antenna 302, normally configured for operation with the data network or WRAN, are provided to the circuit for receiving broadcast signals or sense circuit. Broadcast sense undesired mode may be used to determine, for instance, if too large of a broadcast signal level is received by the data antenna, antenna 302, indicating a possible issue with antenna orientation.

In a third preferred mode, antenna 302 is connected to the data circuit while antenna 306 is not connected to either circuit. This third preferred mode is called normal data mode. In this mode, normal signal communication occurs between the antenna configured for data operation, antenna 306, and the data circuit. However, normal transmission may not occur based on the control of T/R switch 340 by controller 370. In an alternate fourth mode, antenna 302 is connected to the data circuit while antenna 306 is connected to the sense circuit. This alternate mode is known as monitored data mode. In this mode, normal signal communication occurs as described in normal data mode, but signal communication of signals received through antenna 306 to the sense circuit may also occur simultaneously. The sense circuit may, for instance, provide continuous monitoring of broadcast signal conditions. Alternately, sense receiver/demodulator 330 may provide the received and demodulated broadcast signal to other circuits. Other modes may also be possible based on the switching functions in antenna switch 320. For example, connection of data modulator/transmitter 360 to antenna 306 would not be permitted at any time and such a connection prohibited by the operation of controller 370. Controller 370 and memory 372 may be configured to comply with this requirement or other requirements of differing standards.

Although the transceiver and circuits described in FIG. 3 include a separate antenna for use with broadcast reception and a separate antenna for use with data communications or WRAN operation, it may be possible to utilize a single antenna. The single antenna may be either mechanically or electrically steerable or rotatable as is known to those skilled in the art. For example, the single antenna could be axially rotated a certain arc distance, such as 90 degrees, on the antenna mast 308 with the addition of an antenna rotator and control circuit. The single antenna can then be rotated into a position used for broadcast signal operation, such as horizontal polarization, in one mode of operation. The single antenna could then be rotated into a position used for data communications operation in a second mode. Simultaneous broadcast signal operation and data communication operation may not be possible in this single axially rotatable antenna configuration. Further, if such a single antenna is adjusted or rotated in to an axial position for a maximum received signal from a broadcast signal, then an accurate rotation of 90 degrees from that position could be used to optimally orient the antenna for proper WRAN operation. Alternately, the single antenna could be adjusted for a minimum received signal from a broadcast signal, then rotated 90 degrees to confirm a maximum received signal from a broadcast signal.

Figure 4:
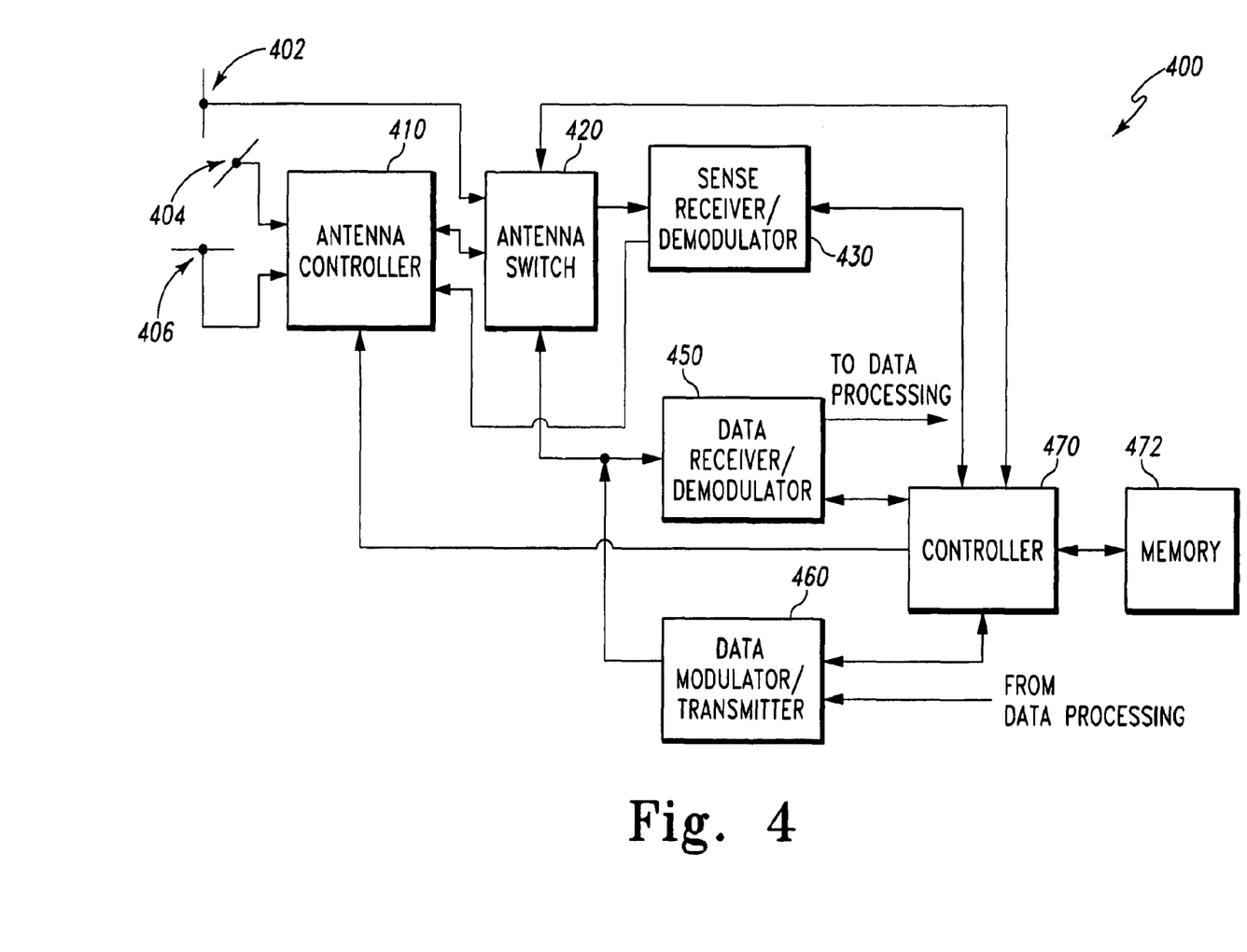
FIG. 4 is a block diagram of another embodiment of a transceiver device using an embodiment of the present disclosure is shown.

Turning to FIG. 4, a block diagram 400 of another transceiver and associated circuitry using another embodiment of the present disclosure is shown. Except as noted below, antenna switch 420, sense receiver/demodulator 430, data receiver/demodulator 450, data modulator/transmitter 460, controller 470, and memory 472 have functions similar to those described in FIG. 3 previously and will not be further described here. In FIG. 4, antenna 402, antenna 404, and antenna 406 are preferably dipole antennas. A dipole antenna 402 mounted vertically typically has a uniform radial receiving pattern in the horizontal plane. However, in order to achieve a uniform radial receiving pattern in the vertical plane, two dipole antennas, shown as antenna 404 and antenna 406, may be used and oriented in a cross-wise fashion. An arrangement as shown eliminates the need for a rotating mast and rotor control as shown in FIG. 3. Antenna 402 antenna 404, and antenna 406 may be mechanical mounted on a common antenna mast, not shown, or may be separately mechanically mounted. It is important to note that it is critical to this application to have antenna 402 accurately mounted at a right angle to the plane of antennas 404 and 406.

Antenna 404 and antenna 406 connect to antenna controller 410. Antenna controller 410 determines the manner in which antenna 404 and antenna 406 connect to antenna switch 420. Antenna controller 410 may include a switch for selecting and connecting either antenna 404 or antenna 406 to antenna switch 420. A control signal may be provided from controller 470 and derived using inputs from either sense receiver/demodulator 430 or from data receiver/demodulator 450. Antenna controller 410 may also include a combiner circuit for combining the signals received by antenna 404 and antenna 406 before providing them to antenna switch 420. Antenna controller 410 may control the connection of antenna 402 and antennas 404/406 the same or differently depending on whether in sensing or operational modes. For example, sensing may utilize antennas 404 and 406. Normal data operation would utilize antenna 402.

One connection from antenna switch 420 connects directly to both data receiver/demodulator 450 and data modulator/transmitter 460. The direct connection is more common in transceiver systems employing either half duplex or full duplex communications as opposed to the simplex communications based transceiver described above. Controller 470 may provide transmission enable and disable control directly to data modulator/transmitter 460.

Controller 470 may also adjust the transmission signal power or signal level of data modulator/transmitter 460. Transmission signal power adjustment may be accomplished within data modulator/transmitter 460 using a number of known techniques including incorporating an attenuator circuit or adjusting the signal gain of one or more transmitter amplifiers. In this manner, the transceiver may continue to transmit but in a reduced transmit power condition. The reduced transmit power condition may be determined based on signal conditions of a local broadcast station in a way that interference either remains non-existent or is minimized to an acceptable level.

As mentioned above, one way to prevent interference between two systems, such as WRAN and broadcast television, using the same frequencies, or adjacent frequencies, is to ensure that the two systems operate using signals that are orthogonally polarized with respect to each other. Broadcast television stations primarily utilize horizontal polarization for signal transmission. As a result, the data communications or WRAN signal can maintain an orthogonal polarization by utilizing vertical polarization. Although it may be desirable to maintain perfect orthogonal polarization, orientation that is only near-perfect may still result in a high level of cross-polarization isolation between the broadcast signal and a data communications signal such as used in a WRAN. For antennas capable of producing a polarized radiation pattern in vertical or horizontal orientation, the cross-polarization isolation is proportional to the cosine of the angle between the undesired radiation polarization pattern and desired signal antenna. If the angle is 90 degrees, the isolation would be infinite. However, if the angle between is 78.5 degrees, the isolation drops to 14 dB. An error in polarization angle such as described may produce a degradation level that does not result in unacceptable interference with the broadcast television signal.

It is also important to note that although most broadcast stations utilize horizontal polarization for transmission, a few broadcast stations employ a different polarization. Some broadcast stations may even employ elliptical or vertical polarization. As a result, these few instances must be determined before operation of a data communications system on or adjacent to these broadcast channels can be allowed in order to prevent interference. In many cases, operation of a data communications system using channels occupied by these broadcast channels in the particular geographic area may need to be prohibited.

Figure 5:
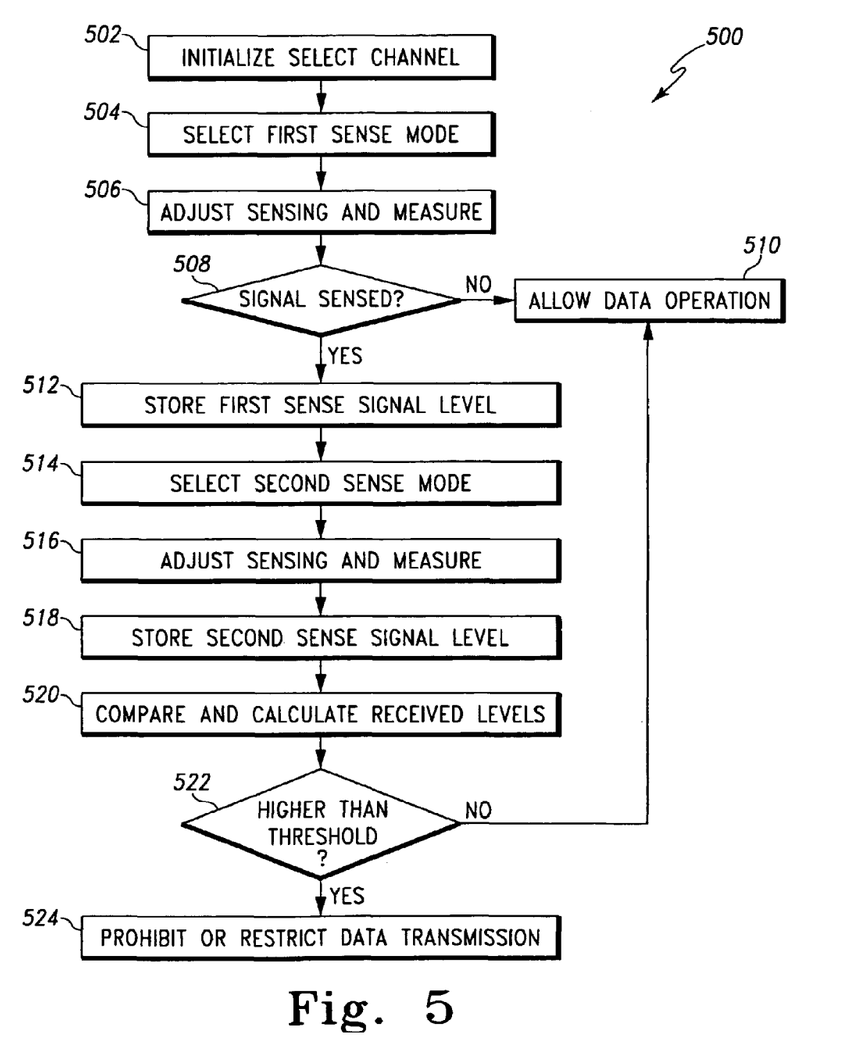
FIG. 5 is a flow chart illustrating an exemplary process for controlling transmission using an embodiment of the present disclosure.

Turning to FIG. 5, a flow chart illustrating an exemplary process 500 for controlling transmission using an embodiment of the present disclosure is shown. The process 500 may be used for controlling the operation of a transmitter control circuit used with a transceiver used in the CPE 240 or base station 210 operating in a WRAN. The flow chart contains steps indicating a complete process based on a particular embodiment of the method. One skilled in the art should appreciate that several of the steps may be omitted or exchanged in order to accommodate a different embodiment as may be required for a different standard of operation.

At step 502, initialization is performed. The initialization step 502 is performed in a device such as a CPE 240 and may include initial power up and/or software booting and may also include several self check operations. The initialization step 502 may further include preparing the CPE 240 to receive a signal, including selecting a channel for initial operation. The initial channel may be selected through a user selection or retrieved from a memory location. The channel selection information may be communicated from the controller 370 to both the sense receiver/demodulator 330 and the data receiver/demodulator 350. In this manner, the initialization step 502 may be part of the initial "association" phase between a CPE and a base station described previously.

Next, at step 504, a first receiving mode, such as the broadcast sense desired mode described above, is initiated. In this mode, the antenna, such as antenna 306, normally used for receiving broadcast signals is connected to sense receiver/demodulator 330. Next, at step 506, circuitry associated with the sensing operation of a received signal is adjusted and the received signal is detected and/or measured using sense receiver/demodulator 330. The sensing operation at step 506 may be adjusted and maximized by adjusting, for instance, the rotational position of antenna mast 308 through rotor controller 310. Next, at step 508, the measured received value from step 506 is used to determine whether a signal was detected or if the signal received and sensed was high enough in signal level. The received and sensed signal level may be compared to a predetermined threshold. For example, the predetermined threshold may be the expected background received noise level or it may be a threshold level at which a receiving circuit could not properly demodulate and display the received signal. If, at step 508, no signal was detected or the sensed signal was not high enough in signal level then, at step 510, information indicating that no broadcast signal is present on the selected channel is recorded in a memory such as memory 372. As a result, normal data operation in the WRAN may proceed, and no additional transmission restrictions are necessary.

If, at step 508, a signal is present and is high enough in signal level then, at step 512, information including this received signal level is stored in a memory. Next, at step 514, a second receiving mode, such as broadcast sense undesired mode is initiated. In this mode, the antenna, such as antenna 302, normally used for data communication is connected to sense receiver/demodulator 330. Next, at step 516, the sensing operation in the second received mode is adjusted or optimized and a signal level is detected and measured as described in step 506 above. At step 518, the received signal level determined from the second receiving mode is stored in a memory.

Next, at step 520, the first received signal level stored in step 512 and second received signal level stored in step 518 are retrieved and calculations are performed. A calculation may be performed, for instance, by forming a ratio of the two signal levels. The calculation may also include other information that is stored in memory and associated with the selected channel. For example, the calculations may include information about different gains of the two antennas. At step 522, the calculation involving the two signal levels is compared to a predetermined threshold. The predetermined threshold may, for instance, be related to the allowable cross-polarization isolation between the antennas used in broadcast and in data communications, such as the value of 14 dB described above. If, at step 522, the calculated value from step 518 exceeds the predetermined threshold, then sufficient to polarization isolation between the antenna used for broadcast reception and the antenna used for data communications in the broadcast band exists. The calculated value indicates that the antenna used for data communications is configured to operate orthogonally to the broadcast signal on the selected channel. Data communication operation proceeds at step 510, as described above.

If, at step 522, the calculated value from step 518 does not exceed the predetermined threshold, then insufficient cross-polarization may exist. A problem may exist with one or the other antenna used for either broadcast reception or data communications and as a result, at step 526, transmission by data modulator/transmitter 360 is prohibited in order to prevent interference with the existing broadcast signal. Alternately, at step 526, transmission may be reduced to a transmission signal power level that does not result in a level of unacceptable interference. The process may continue by selecting another channel either by user input or from memory and repeating the process from step 504.

Figure 6:
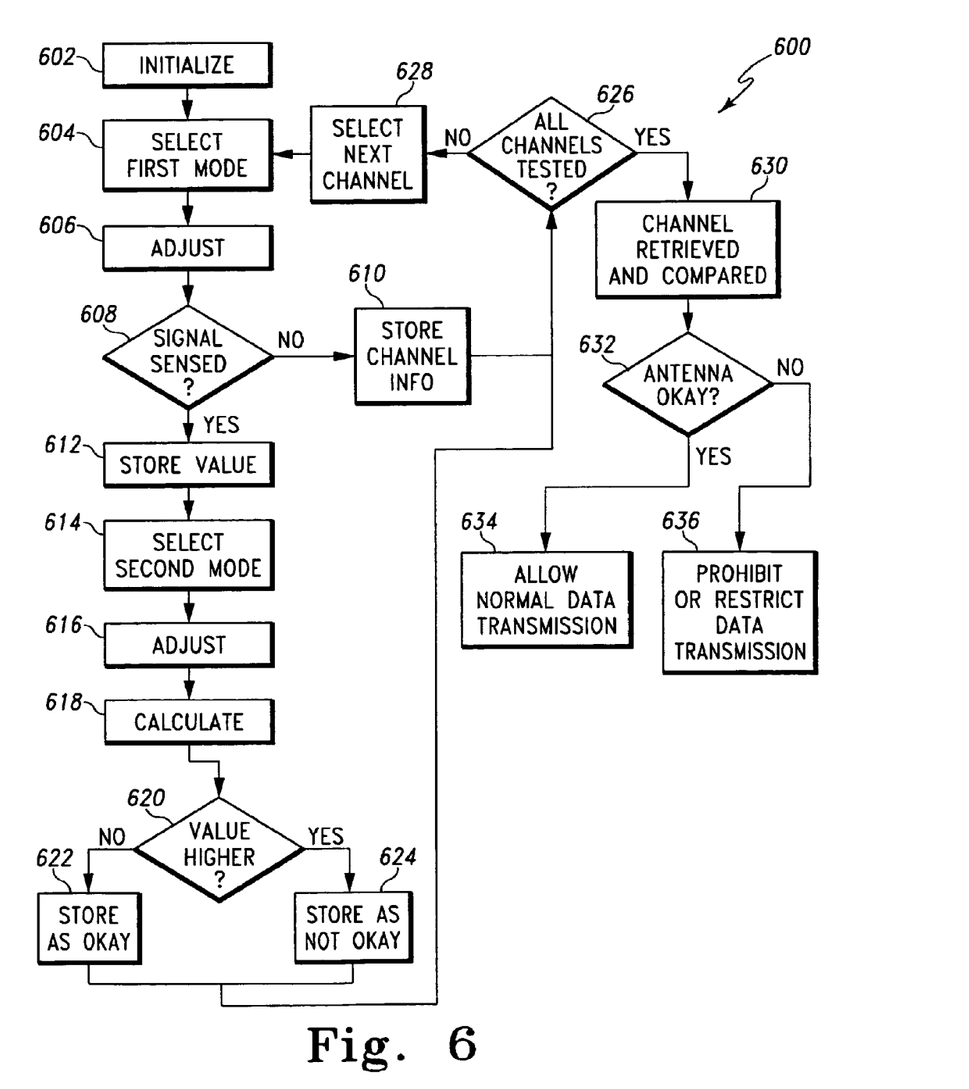
FIG. 6 is a flow chart illustrating another exemplary process for controlling transmission using an embodiment of the present disclosure.

Turning to FIG. 6, a flow chart illustrating another exemplary process 600 for controlling transmission using an embodiment of the present disclosure is shown. Process 600 is similar to process 500 described earlier except process 600 describes additional steps necessary to process multiple selected channels. The process may include determining the channels that can be used for data communication by processing some or all of the possible channels, in addition to checking proper antenna operation on some or all of the channels. As a result, some of the steps described previously either are not shown here or are not described further except where they differ from the description provided above.

The process begins with initialization, including selecting an initial channel of operation, at step 602, selecting a first receiving mode at step 604, and adjusting the sensing of the first receiving mode at step 606. Next, at step 608, a determination is made if a signal is present as described above. If, at step 608, a signal is not present or the received signal level of the signal sensed is not sufficient in level, at step 610, information regarding the initially selected channel is stored.

If, at step 610, a signal is present and the received signal level is determined to be sufficient then, at step 612, the signal level is stored as described above. The process continues with selecting a second receiving mode at step 614, adjusting the sensing of the second receiving mode at step 616, and calculating using the two received signal values at step 618. Next, at step 620, the calculated value is compared to a predetermined threshold, as described above. If, at step 620, the calculated value at step 618 exceeds a predetermined value then, at step 622, information is stored in memory indicating the selected channel is acceptable for data communication. Additionally, no error conditions regarding the antennas are present for the selected channel.

If, at step 620, the calculated value at step 618 does not exceed the predetermined value, then information is stored in memory indicating that this channel is not okay for data communication. However, as described earlier, a broadcast station may employ a polarization other than horizontal polarization. In this case, checking a single channel may not provide sufficient information regarding the proper antenna orientation used for data communications. Additional channels should be tested. As a result, the process continues iteratively from step 622, step 624, or step 610 to step 626.

At step 626, a determination is made as to whether additional channels remained to be tested. The channel list may be entered by a user or may be stored in memory. Additionally, the user may be prompted for additional channels as necessary. If, at step 626, additional channels remain to be tested then, at step 628, the next to channel is tested. The process repeats beginning with step 604.

If, at step 626, all remaining channels have been tested then, at step 630, the channel information stored in memory is retrieved and compared. The data may be compared to determine additional information regarding the signal environment, such as number, location, and signal strength of local broadcast channels. Information may also be retrieved regarding measured received signal levels and calculated values from both receiving modes in order to determine proper antenna operation and the polarization of the local broadcast signals. If, at step 632, the data comparison indicates that the antenna to be used for data communications is oriented properly in order to transmit orthogonally and avoid interference to the local broadcast channels then, at step 634, data transmission is allowed. It should be noted, that the comparison in step 630 may additionally indicate that data transmission may be allowed only on certain channels. Information regarding the permitted transmission conditions may be stored in memory.

If, at step 632, the data comparison at step 630 indicates an error exists regarding the orientation of the antenna to be used for data communications then, at step 636, data transmission is prohibited. Additionally, information regarding the antenna orientation may indicate that data transmission is permitted but at a reduced transmit power level in order to avoid interference with the local broadcast channels. The steps in the process starting with either step 620 or step 630 may be resumed once the error condition associated with the antenna orientation has been addressed.

Although the methods described in process 500 and process 600 are conditioned for initial operation, it may also be possible to continuously monitor the operation of the device and to determine if an error occurs regarding antenna orientation. As a result, the device may disable or alter transmission any time the process indicates that an error, such as a misalignment, exists.

While the embodiments of the present disclosure may be susceptible to various modifications and alternative forms, specific embodiments have been shown by way of example in the drawings and are described in detail herein. However, it should be understood that the disclosure is not intended to be limited to the particular forms disclosed. Rather, the disclosure is to cover all modifications, equivalents and alternatives falling within the scope of the disclosure as defined by the following appended claims.

What is claimed is:

1. An apparatus for controlling a signal comprising:
   a first antenna for receiving a first signal using a first polarization;
   a second antenna for receiving said first signal and for receiving and transmitting a second signal in a second polarization; and
   a controller coupled to said first antenna and said second antenna for adjusting the transmitting by said second antenna in response to said first signal received by said first antenna and said second antenna, the controller adjusting the transmitting of said second signal in order to prevent interference of said transmitted second signal with said first signal.

2. The apparatus as claimed in claim 1, wherein said first antenna and said second antenna have orthogonal radiation patterns.

3. The apparatus as claimed in claim 2, wherein said first antenna operates to optimally receive signals in a horizontal radiation pattern.

4. The apparatus as claimed in claim 2, wherein said second antenna operates to optimally receive signals in a vertical radiation pattern.

5. The apparatus as claimed in claim 1, wherein said first antenna is used to receive television broadcast signals.

6. The apparatus as claimed in claim 1, wherein said second antenna is used for signal communications in a data communications network.

7. The apparatus as claimed in claim 6, where said data communications network is a wireless regional area network.

8. The apparatus as claimed in claim 1, further comprising
   a first receiving circuit selectively coupled to said first antenna and said second antenna for receiving and demodulating said first signal; and
   a second receiving circuit selectively coupled to said first antenna and said second antenna for receiving and demodulating said second signal.

9. The apparatus as claimed in claim 8, wherein said first receiver circuit includes a detector coupled to said controller for determining the presence of said first signal.

10. The apparatus as claimed in claim 1, further comprising a transmitting circuit selectively coupled to said second antenna for modulating and transmitting said second signal.

11. The apparatus as claimed in claim 10, wherein said controller adjusts the transmitting by disabling operation of said transmitting circuit.

12. The apparatus as claimed in claim 10, wherein said controller adjusts the transmitting by reducing transmitter power of said transmitting circuit.

13. The apparatus as claimed in claim 1, wherein said apparatus is included in a wireless data communications device.

14. The apparatus as claimed in claim 1, wherein said first signal and said second signal operate at the same frequency.

15. A method for controlling a signal, comprising the steps of:
   receiving a first signal using a first polarization;
   receiving said first signal using a second polarization;
   transmitting a second signal using said second polarization; and
   controlling the transmitting step in response to said step of receiving using said first polarization and said step of receiving using said second polarization in order to prevent interference of said transmitted second signal with said first signal.

16. The method of claim 15, wherein said first polarization is orthogonal to said second polarization.

17. The method of claim 15, wherein said first polarization is used for television broadcast signals.

18. The method of claim 15, wherein said second polarization is used for signal communications in a data communications network.

19. The method of claim 15, wherein said step of controlling includes preventing said transmitting step.

20. The method of claim 15, wherein said step of controlling includes reducing transmitter power available in said transmitting step.

21. The method of claim 15, wherein said first signal and said second signal operate at the same frequency.

22. An apparatus comprising:
means for receiving a first signal using a first polarization;
means for receiving said first signal using a second polarization;
means for transmitting a second signal using said second polarization; and
means for adjusting said means for transmitting in response to said means for receiving using said first polarization and said means for receiving using said second polarization in order to prevent interference of said transmitted second signal with said first signal.

* * * * *